United States Patent
Pauwels

(10) Patent No.: US 6,901,054 B2
(45) Date of Patent: May 31, 2005

(54) METHOD FOR CHECKING THE TRANSFER OF DATA CELLS IN AN ASYNCHRONOUS SWITCHING ARRANGEMENT, ELEMENTARY SWITCHING UNIT AND NETWORK EQUIPPED FOR SUCH A METHOD

(75) Inventor: Bart Gerard Pauwels, Tessenderlo (BE)

(73) Assignee: Alcatel, Paris (FR)

( * ) Notice: Subject to any disclaimer, the term of this patent is extended or adjusted under 35 U.S.C. 154(b) by 868 days.

(21) Appl. No.: 09/732,748

(22) Filed: Dec. 11, 2000

(65) Prior Publication Data
US 2001/0004351 A1 Jun. 21, 2001

(30) Foreign Application Priority Data
Dec. 16, 1999 (EP) .............................................. 99403179

(51) Int. Cl.$^7$ ............................. H04L 1/00; H04L 12/28
(52) U.S. Cl. ...................... 370/250; 310/395.1; 310/252
(58) Field of Search ................................ 370/241, 244, 370/248, 250, 216, 252, 395.1, 397, 235, 236, 395.2, 395.21, 395.43, 395.63, 503, 509

(56) References Cited

U.S. PATENT DOCUMENTS

| | | | | |
|---|---|---|---|---|
| 5,142,653 A | | 8/1992 | Schefts | |
| 5,488,606 A | * | 1/1996 | Kakuma et al. | 370/219 |
| 5,887,000 A | * | 3/1999 | Adachi et al. | 714/712 |
| 6,246,665 B1 | * | 6/2001 | Watanabe et al. | 370/218 |
| 6,359,885 B1 | * | 3/2002 | Kim et al. | 370/390 |
| 6,477,141 B1 | * | 11/2002 | Izawa et al. | 370/219 |

FOREIGN PATENT DOCUMENTS

| | | |
|---|---|---|
| EP | 0 336 401 A2 | 10/1989 |
| EP | 0 422 795 A2 | 4/1991 |

* cited by examiner

Primary Examiner—Chau Nguyen
Assistant Examiner—Andy Lee
(74) Attorney, Agent, or Firm—Sughrue Mion, PLLC

(57) ABSTRACT

For checking transfer of data cells in an asynchronous switching arrangement, cells are cyclically marked and counted before entering and after leaving the arrangement.

A periodical time frame composed of N interleaved checking cycles is imposed. Each cycle (C1) includes two phases, a first phase (IC1) for marking and counting the cells, when received and before switching, and a second counting phase (OC1) for counting cells after switching. An identification mark is introduced in every cell received during the first phase of every cycle, it is linked to the position of this cycle in the time frame. Cells marked according to a cycle are counted as soon as switched during the second phase of the cycle, which starts with a determined delay (d1) during each first phase, for a determined duration (t2). A determination of the correspondence between the two counts obtained during a cycle is made and induces a fault signaling as soon as such a correspondence as otherwise determined is not obtained.

5 Claims, 1 Drawing Sheet

METHOD FOR CHECKING THE TRANSFER OF DATA CELLS IN AN ASYNCHRONOUS SWITCHING ARRANGEMENT, ELEMENTARY SWITCHING UNIT AND NETWORK EQUIPPED FOR SUCH A METHOD

BACKGROUND OF THE INVENTION

The present invention relates to a method for checking the transfer of data cells in an asynchronous switching arrangement and more specifically for detecting transfer errors of data cells due to unacceptable delays and unwanted copying. It also relates to switching units equipped for such a check.

Information transfer in an asynchronous switching network by means of data cells is disturbed when excessive delays or losses of data cells happen, such drawbacks being linked for instance to internal queuing for a switching unit in a switching arrangement.

Occurrence of such unacceptable delays at the level of a switching arrangement, for instance in an elementary switching unit, for the smallest or in a switching network for the biggest, is usually checked by measurements carried out at the edges of the switching arrangement. Localization of a faulty element, for instance a faulty buffer or a faulty switching device requires generation of dedicated test traffic and corresponding measurements. Use of dedicated test traffic connections is known for connection oriented switches, putting out of service a part of a switch is usually carried out with multi-path switches. All this usually requires specialized technicians with appropriate testing equipment and is sometimes long and costly, for instance when there are sporadic, pattern related malfunctions which are hard to reproduce on will, and consequently to localize.

Accordingly and as much as possible, test traffic for a detection in a large switching arrangement is usually limited in time and/or to a part fraction of the traffic which is transferred, for instance less than 1% of the total traffic. Obtention of a global detection picture, if possible, and localization of a faulty element are rather long tasks and accordingly they are not as efficient as needed.

An object of this invention, therefore, is to provide a method for checking the transfer of data cells in an asynchronous switching arrangement.

According to the invention, the method comprises a marking and a counting of the cells received and a counting of the cells, after switching when outputted from the switching structure of the arrangement, in order to verify that the counts correspond and to find transfer errors of data cells due to unacceptable delays and unwanted copying in the switching structure, said marking and said counting being obtained according to a periodical time frame made of interleaved checking cycles which are grouped by limited and successive series of a same determined number of cycles, each cycle including a first phase for marking and counting the cells as they are received, the identification mark, introduced in every cell received during this first phase, being related to the position of the cycle among the other cycles of the same series, with each first phase of a cycle following immediately the first phase of the preceding cycle, a second phase, overlapping with the first phase, starting with a determined delay which may be zero, after the beginning of the first phase of the same cycle and during this first phase, for a determined duration and for counting the cells, as soon as switched, which contain the identification mark introduced during the first phase of the same checking cycle, a determination being made at the end of the second phase of each checking cycle of the correspondence between the two counts obtained during the cycle, with a specific signaling as soon as the correspondence as otherwise determined for a cycle is not obtained.

Another object of this invention is to provide an elementary asynchronous switching unit including at least one asynchronous switching arrangement provided with means for checking the transfer of data cells in this elementary unit.

Another object of the invention is to provide an asynchronous switching network or sub-network including inter-linked switching units in one or several asynchronous switching arrangement(s), with each arrangement provided with means for checking the transfer of data cells in this elementary unit.

It should be noticed that the term 'comprising', used in the claims, should not be interpreted as being limitative to the means listed thereafter. Thus, the scope of the expression 'a device comprising A and B' should not be limited to devices consisting only of components A and B. It means that with respect to the present invention, the only relevant components of the device are A and B.

BRIEF DESCRIPTION OF THE DRAWINGS

These and other objects, advantages and features of the invention will become apparent from the following description thereof taken in conjunction with the accompanying drawings, which illustrate a specific embodiment of the present invention.

DETAILED DESCRIPTION OF THE INVENTION

Figure 1:
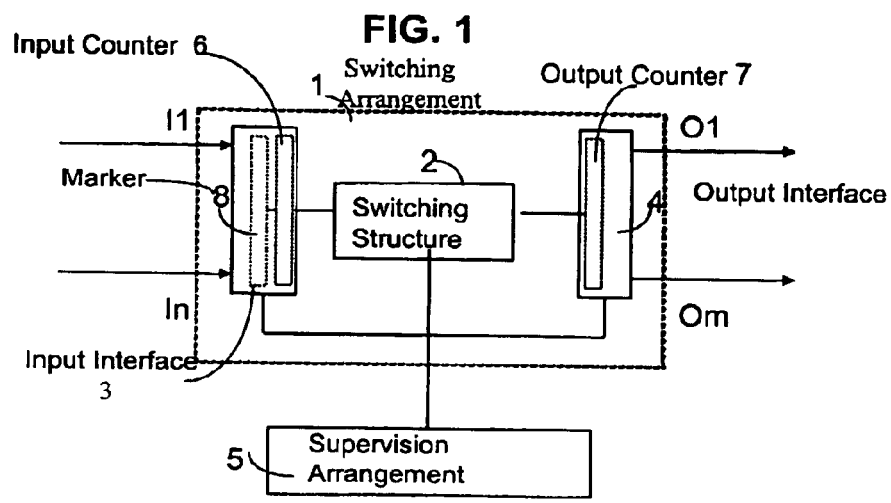
FIG. 1 is a schematic view of an asynchronous switching arrangement.

It is considered here that an asynchronous switching arrangement, as illustrated on FIG. 1 corresponds to the schematic basis structure common to all asynchronous switching items, from the elementary asynchronous switching units to the asynchronous switching networks themselves. An elementary asynchronous switching unit corresponds to an asynchronous switching arrangement, a network comprises inter-linked switching units organized in several asynchronous switching arrangements.

A basic asynchronous switching arrangement 1, as shown on FIG. 1, comprises one or more data cell inputs I1 to In for incoming data cells transferred by data links in order to be switched in a switching structure 2 for further transfer according to the needs of the switching network users, along transfer paths which are then available through this network for proper transfer to each recipient. It also comprises one or more data cell outputs O1 to Om for the transfer of data cells by outgoing data links from the switching structure 2, as soon as switched.

As known, the organization of the switching structure 2 corresponds to the main difference existing between asynchronous switching items, as considered here.

Incoming cells are received by means of an input interface 3 before being switched, in order to be oriented as necessary for switching purposes, usually according to routing information included in their respective cell headers.

Outgoing cells are transferred, as soon as switched, which may consist of an integrity check, a routing and a queuing operation, from the switching structure to the outgoing links respectively connected to outputs O1, Om, by means of an output interface 4.

As already pointed out above, the switching structure 2 comprises at least one and often several cascaded switching units connected to the data cell inputs I1 in and to the data cell outputs O1, Om. The switching arrangement 1 and more specifically the switching structure 2 are controlled by means of a supervision arrangement 5. Such a supervision arrangement usually includes control-processing units and clock-processing units with eventually some of their respective components located in the switching structure itself.

As already known, the switching structure 2 is a buffered structure which includes queuing devices including memory buffers for organizing appropriately the internal data cell traffic. Each cell to be further communicated is temporarily stored in a switch memory buffer as soon as it arrives before being transferred and as long as it cannot be further transferred from this switch memory buffer due to traffic volume. Accordingly there are risks of excessive cell delays or even of cell losses related to malfunctions in the queuing organization and more particularly in the book keeping of cells in the queues of the switching structure.

However, as long as there is a transfer of cells provided from a switch memory buffer with a maximal time delay for every individual cell transfer, there is also a possibility of checking whether the cell is output as foreseen.

According to the invention, a repetitive checking is made at the level of a switching structure 2, regardless of its constitution, in order to know if its traffic output corresponds to its traffic input, as otherwise determined, such a determination being usually obtained at the level of a supervision organization. For this purpose, cells are continuously and cyclically counted when arriving and when leaving a switching structure 2 by respective input counting means 6 and output counting means 7.

According to the invention, the incoming cells transferred to switching arrangement 1 are specifically marked, for identification purposes, as soon as they are received by marking means 8 located for instance in the input interface 3 together with the input counting means 6, in order to be counted according to their respective identification mark after switching, just before being further outputted from the switching arrangement.

Figure 2:
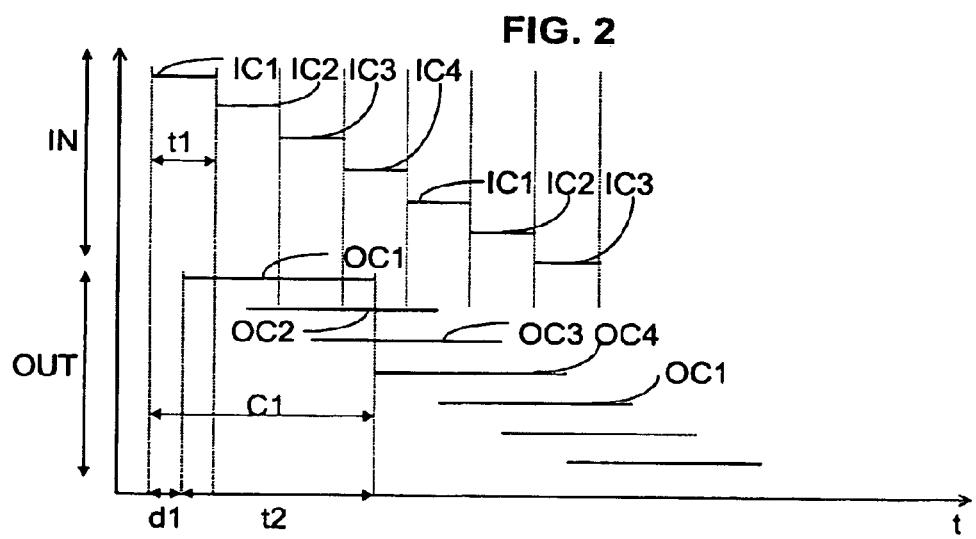
FIG. 2 is a schematic diagram showing the interleaving of observation cycles including two overlapping phases for input counting and output counting, according to an example relating to the detection method according to the invention.

For this purpose marking and counting at the level of an asynchronous arrangement are obtained according to a periodical time frame made of interleaved checking cycles, which are grouped by limited and successive series of a same determined number of identical cycles, for instance four cycles in each series. Each cycle, such as C1 on FIG. 2, is divided in two phases, a first phase IC1 for marking and counting the cells as soon as they are received and a second phase OC1 for counting the cells as soon as they are switched for further transfer outside of the switching arrangement. Each incoming cell receives an identification mark corresponding to the position of the cycle during which it is received among the other cycles of the same series, for instance a two bits indication corresponding to the rank of the cycle among four, when there are four cycles in each series. The means for marking will not be detailed here, as they are already known from the prior art.

According to the invention, the first phase of each cycle immediately follows the first phase of the preceding cycle of the same series or of the preceding series, such as first phase IC2 after first phase IC1, first phase IC3 after phase IC2 and second first phase IC1 after first phase IC4 on FIG. 2. Each second phase starts with a determined delay d1 after the beginning of the first phase of the same cycle and for a determined duration t2, with t1 being the duration chosen for every first cycle. Determined delay d1 is a fixed value chosen smaller than or at most equal to the minimal duration required by switching structure 2 for the transfer of a cell. Duration t2 is a fixed value at least equal to the sum of delay d1 with the determined maximal duration requested for the transfer of a cell by the switching structure, knowing that t1 is necessarily chosen longer than d1.

The cells received by the switching arrangement during any first phase are marked according to the cycle including this first phase and they are counted up as received during this first phase during all its duration. The counting means will not be detailed here, as they are also already known from the prior art.

After switching and before being transferred from the switching arrangement 1, the cells are counted again according to their respective marks corresponding to the checking cycle during which they were received. The output counting for each cycle is made during the second phase of the cycle for the cells containing the mark, which corresponds to the rank of the cycle in the series to which it belongs. As clearly understandable from FIG. 2, they are several countings simultaneously in progress for cells having different cycle marks during coexisting parts of second phases. This happens, for instance, when there are simultaneously a counting in progress during the second phase OC1 of cells marked according to cycle C1, a counting in progress during the second phase OC2 of cells marked according to cycle C2 and a counting in progress during the second phase OC3 of cells marked according to cycle C3, due to the fact that the checking cycles are interleaved.

A determination is made at the end of each second phase which corresponds to the end of the cycle including this second phase in order to point out if a correspondence otherwise determined between the input count and the output count for the cycle is obtained. Accordingly, the input and output counts for a cycle are found equal, if there is no duplication of cells specifically foreseen for at least one cell received during a first phase of a cycle, such as IC1 for cycle C1, and as long as there is no transfer error relating to the cells which were marked.

If as it happen that, for instance, there is an indication in the header of a cell pointing out that a multiplication, involving one or more copies, is requested at the level of the switching arrangement for further transfer of the cell to different destinations, the indication is processed as soon as received during a first phase of a cycle and one of the two countings made during this cycle is modified accordingly in order to have the intended correspondence obtained.

If corresponding input and output countings do not fit together, the result of the comparison is used in order to trigger a transfer error signaling from asynchronous switching arrangement 2 toward its supervision arrangement 5.

As long as the respective correspondences are as foreseen at the end of successive checking cycle, there is no need for transfer error signaling from the asynchronous switching arrangement.

Figure 3:
FIG. 3 is a schematic diagram illustrating an example of input and output counts related to an observation cycle

In a preferred form, the input count during the first phase of a cycle is a count up realized in a dedicated counter and the output count during the following second phase of the cycle is a count down in the same counter, each cycle of a series having a dedicated counter according to its rank in the series. Accordingly, if there is no duplication of cells specifically foreseen among the cells received during a first phase, such as IC1 on FIG. 3, the end value obtained at the end of a cycle C must be zero if the sum value counted up of received cells at the end of the first phase corresponds exactly to the counted down value of transferred cells marked according to cycle C and obtained at the end of the second phase by which cycle C ends.

Taking into account requests for cell multiplication is easily obtained by an increase of the counting up or a decrease of the counting down as many times as they are copies of a cell which are requested. As exemplified on FIG. 3, the input count of received cells marked according to a cycle, such as C1, can increase only during all the first phase IC1 of this cycle. A decrease is possible as soon as the second phase OC1 starts. At the end of first phase IC1, during the rest of second phase OC2, the count can only decrease for cells marked according to C1. The checking at the end of the cycle is correct if a zero count is obtained and then there is no specific error checking provided as long as a zero count is obtained at the end of the following checking cycles.

It must be also understood that the constitution of the input counting means 6 for a switching structure is dependent from the number "n" of data cell inputs of the switching structure as well as the constitution of the output counting means 7 is dependent from the number "m" of data cell outputs for this switching structure.

What is claimed is:

1. A method for checking the transfer of data cells in an asynchronous switching arrangement (1), said method comprising the steps of:

marking and counting cells received; and counting the cells, after switching when outputted from a switching structure (2) of the arrangement, in order to verify that the counts correspond and to find transfer errors of data cells due to unacceptable delays, loss and unwanted copying in the switching structure, said marking and counting of received cells and counting of cells after switching being performed according to a periodical time frame made of interleaved checking cycles which are grouped by limited and successive series of a same determined number of cycles, each cycle (C1) including a first phase (IC1) for marking and counting the cells as they are received, the identification mark, introduced in every cell received during this first phase, being related to the position of the cycle among the other cycles of the same series, with each first phase of a cycle following immediately the first phase of the preceding cycle, and a second phase (OC1), starting with a determined delay (d1) after the beginning of the first phase of the same cycle, during and after this first phase for a determined duration (t2) and for counting the cells, as soon as switched, which contain the identification mark introduced during the first phase of the same checking cycle, a determination being made at the end of the second phase of each checking cycle of the correspondence between the two counts obtained during the cycle, with a specific signaling as soon as the correspondence as otherwise determined for a cycle is not. obtained.

2. A method according to claim 1, wherein the result of the counting of cells specifically marked according to a determined cycle relative to one series of cycles is obtained by a count down of cells, as soon as switched, during the second phase of said cycle from instantaneous sum value counted up of cells as soon as received, which instantaneous sum value is obtained at any moment during the first phase of the cycle, in order to obtain a zero value at the end of the said second phase if the correspondence between counts is verified.

3. A method according to claim 1, wherein one of the two countings made during a phase is modified as many times as there are copies of a received cell requested at the level of the switching arrangement.

4. An elementary asynchronous switching unit, comprising an asynchronous switching arrangement (1), including data cell transfer checking apparatus for marking and counting the cells as soon as received and for counting the cells, as soon as switched, when outputted from the switching structure of the arrangement in order to verify that the counts correspond and to find transfer errors of data cells due to unacceptable delays and unwanted copying in the switching structure, said data cell transfer checking apparatus including a marker (8) and counters (6, 7) which perform said marking and counting and said counting according to a periodical time frame obtained from a timing control and made of interleaved checking cycles which are grouped by limited and successive series of a same determined number of cycles, each cycle (C1) including a first phase (IC1) for marking and counting the cells as soon as they are received, the identification mark, introduced in every cell received during this first phase, being related to the position of the cycle among the other cycles of the same series, with each first phase of a cycle following immediately the first phase of the preceding cycle, a second phase (OC1), starting with a determined delay (d1) after the beginning of the first phase of the same cycle and for a determined duration (t2) for counting the cells, as soon as switched, which contain the identification mark introduced during the first phase of the same checking cycle, a determination being made from the counters at the end of the second phase of each checking cycle of the correspondence between the two counts made during the cycle with a specific signaling as soon as the correspondence is not obtained.

5. An asynchronous switching network, according to claim 4, which includes inter-linked switching units in one or several asynchronous switching arrangements, characterized in that each asynchronous switching arrangement comprises a data cell transfer checker for marking and counting the cells when received and for counting the cells, as soon as switched; when outputted from the switching structure of the arrangement in order to verify that the counts correspond and to find transfer errors of data cells due to unacceptable delays and unwanted copying in the switching structure, said marking and said counting being performed by a marker (8) and counters (6, 7) according to a periodical time frame obtained from a timing control and made of interleaved checking cycles which are grouped by limited and successive series of a same determined number of cycles, each cycle including a first phase for marking and counting the cells as soon as they are received, the identification mark, introduced in every cell received during this first phase, being related to the position of the cycle among the other cycles of the same series, with each first phase of a cycle following immediately the first phase of the preceding cycle, a second phase, starting with a determined delay, after the beginning of the first phase of the same cycle and during this first phase, for a determined duration and for counting the cells, as soon as switched, which contain the identification mark introduced during the first phase of the same checking cycle, a determination being made from the counters at the end of the second phase of each checking cycle of the correspondence between the two counts during the cycle with a specific signaling as soon as the correspondence is not obtained.

* * * * *